(12) United States Patent
Subash et al.

(10) Patent No.: US 10,445,051 B1
(45) Date of Patent: Oct. 15, 2019

(54) RECORDING AND REPLAY OF SUPPORT SESSIONS FOR COMPUTING DEVICES

(71) Applicant: Amazon Technologies, Inc., Reno, NV (US)

(72) Inventors: Prasanna Subash, Kenmore, WA (US); Jonathan Leonard Da Silva, Seattle, WA (US); Ian W. Freed, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 528 days.

(21) Appl. No.: 14/227,088

(22) Filed: Mar. 27, 2014

(51) Int. Cl.
*G06F 3/14* (2006.01)
*G06F 3/0487* (2013.01)
*G06F 3/0482* (2013.01)
*G06F 3/0484* (2013.01)
*G06F 9/451* (2018.01)
*G06Q 30/00* (2012.01)

(52) U.S. Cl.
CPC .......... *G06F 3/1454* (2013.01); *G06F 3/0482* (2013.01); *G06F 3/0487* (2013.01); *G06F 3/04842* (2013.01); *G06F 9/453* (2018.02); *G06Q 30/016* (2013.01)

(58) Field of Classification Search
CPC .... G06F 3/0482; G06F 9/4446; G06Q 30/016
USPC ........................................................ 715/704
See application file for complete search history.

(56) References Cited

U.S. PATENT DOCUMENTS

| | | | |
|---|---|---|---|
| 5,301,191 A | 4/1994 | Otani | |
| 7,565,338 B2 | 7/2009 | Beniaminy et al. | |
| 8,341,530 B1 | 12/2012 | Inabinet et al. | |
| 8,626,675 B1 | 1/2014 | Satish | |
| 8,924,884 B2 * | 12/2014 | Bank | G06F 17/241 345/619 |
| 2002/0184325 A1 | 12/2002 | Killcommons et al. | |
| 2004/0075619 A1 * | 4/2004 | Hansen | G06F 3/1454 345/1.1 |
| 2005/0180338 A1 | 8/2005 | Pirila et al. | |
| 2006/0277096 A1 * | 12/2006 | Levitus | G06Q 10/06 705/301 |
| 2007/0124601 A1 | 5/2007 | Singh et al. | |
| 2007/0127696 A1 | 6/2007 | White | |
| 2007/0234219 A1 | 10/2007 | Bhattaru | |
| 2008/0168135 A1 | 7/2008 | Redlich et al. | |
| 2008/0189612 A1 * | 8/2008 | Zhang | G06F 9/4446 715/709 |

(Continued)

FOREIGN PATENT DOCUMENTS

| | | |
|---|---|---|
| WO | 2005069112 | 7/2005 |
| WO | WO2013133843 A1 | 9/2013 |

OTHER PUBLICATIONS

Bomgar, Representative Guide 13.1, Nov. 4, 2013, All pages.*

(Continued)

*Primary Examiner* — Kieu D Vu
*Assistant Examiner* — Roberto Borja
(74) *Attorney, Agent, or Firm* — K&L Gates LLP

(57) ABSTRACT

Improved systems and methods for remote support for computing devices are provided in which live support sessions may be recorded for later playback. When these recorded support sessions are replayed, the control inputs generated during the original support session may be delivered to the user computing device to perform the same operations as in the original support session.

22 Claims, 10 Drawing Sheets

(56) References Cited

U.S. PATENT DOCUMENTS

| | | | |
|---|---|---|---|
| 2009/0274070 A1 | 11/2009 | Mukherjee et al. | |
| 2010/0205530 A1* | 8/2010 | Butin | G06F 9/4446 715/715 |
| 2010/0257577 A1 | 10/2010 | Grandison et al. | |
| 2011/0115816 A1 | 5/2011 | Brackney | |
| 2011/0249081 A1 | 10/2011 | Kay et al. | |
| 2012/0027195 A1 | 2/2012 | Shaffer et al. | |
| 2012/0116982 A1 | 5/2012 | Yoshida et al. | |
| 2012/0317487 A1* | 12/2012 | Lieb | G06F 9/4445 715/730 |
| 2013/0030948 A1* | 1/2013 | Fisher, Jr. | G06Q 10/06 705/26.5 |
| 2013/0091205 A1* | 4/2013 | Kotler | H04L 65/4015 709/204 |
| 2013/0122938 A1 | 5/2013 | Sharif-Ahmadi et al. | |
| 2013/0147787 A1 | 6/2013 | Ignatchenko et al. | |
| 2013/0151353 A1 | 6/2013 | Cobb et al. | |
| 2013/0151999 A1 | 6/2013 | Seul | |
| 2013/0218783 A1 | 8/2013 | Anand | |
| 2013/0263288 A1 | 10/2013 | Palanichamy et al. | |
| 2013/0330054 A1* | 12/2013 | Lokshin | H04N 5/77 386/227 |
| 2014/0007222 A1 | 1/2014 | Qureshi et al. | |
| 2014/0052645 A1 | 2/2014 | Hawes et al. | |
| 2014/0089113 A1 | 3/2014 | Desai et al. | |
| 2014/0129458 A1 | 5/2014 | Damnjanovic et al. | |
| 2014/0222865 A1 | 8/2014 | Casey et al. | |
| 2015/0052122 A1* | 2/2015 | Landry | G06F 11/0706 707/723 |
| 2015/0156269 A1 | 6/2015 | Yutani | |
| 2015/0242419 A1 | 8/2015 | Holmquist et al. | |

OTHER PUBLICATIONS

Lorenzo Gomez, Reran: Timing and Touch Sensitive Record and Replay for Android, Feb. 1, 2013, All pages.*

PCT Application No. PCT/US2015/022136, Search Report and Written Opinion dated Jun. 25, 2015, 10 pages.

PCT Application No. PCT/US2014/050701, Search Report and Written Opinion dated Nov. 12, 2014, 9 pages.

Author Unknown, "Amazon.com Help: Connect to a Tech Advisor with the Mayday Button," www.amazon.com Available at www.amazon.com/gp/help/customer/display.html?nodeId=201349900, 2 pgs., (printed Mar. 26, 2014).

Author Unknown, "Amazon.com Help: Mayday: Frequently Asked Questions," www.amazon.com Available at www.amazon.com/gp/help/customer/display.html?nodeId=201364620, 2 pgs., (printed Mar. 26, 2014).

Author Unknown, "eBLVD Remote Desktop User Guide," ENC Technology Corp., Available at eBLVD.com, 46 pgs., (2012-2013).

Author Unknown, "How do I use Problem Steps Recorder," Available at http://windows.microsoft.com/en-us/windows7/how-do-i-use-problem-steps-recorder, 2 pgs., (printed Mar. 27, 2014).

Author Unknown, "RERAN—Record and Replay for Android," Available at http://www.androidreran.com/, 3 pgs., (printed Mar. 27, 2014).

Author Unknown, "Session Recording," Available at http://www.islonline.com/remote-support/features/session-recording.htm?hl=no, 2 pgs., (printed Mar. 27, 2014).

Dale, "Recording and replaying events with Android," Lardcave.net, www.lardcave.net, Available at http://www.lardcave.net, 2 pgs., (printed Feb. 26, 2014).

Fisher, "Steps Recorder (What It Is and How to Use It)," About.com Computing PC Support, Available at http://pcsupport.about.com/od/termsp/p/problem-steps-recorder.htm, 1 pg., (printed Mar. 27, 2014).

Gomez et al., RERAN: Timing- and Touch-Sensitive Record and Replay for Android, ICSE pp. 72-81, (2013).

Kaiser et al, "Step-by-Step Guide to Remote Assistance," Microsoft Corp., (Jul. 1, 2001).

Extended European Search Report for European patent application EP14836015.9; dated Dec. 7, 2016.

* cited by examiner

US 10,445,051 B1

RECORDING AND REPLAY OF SUPPORT SESSIONS FOR COMPUTING DEVICES

BACKGROUND

The use of computing devices by users having varying levels of technical expertise generates new opportunities for providing improved user experiences through convenient and effective customer support. In-person customer support at retail locations and computer service centers can provide a high level of service, but travelling to a physical location may be inconvenient for the customer and the cost of maintaining the staff and facilities at such a location can be undesirably high. Customer support by e-mail might be more convenient as it permits the user to initiate the service request from any location, but results in undesirable delays due to the asynchronous nature of e-mail communication. Telephone support may provide improved response time and a more personal interaction with the support agent, but due to varying user levels of technical expertise and the limitations of voice communications, it may be challenging for the user to clearly communicate the problem being experienced and challenging for the support agent to clearly communicate the steps needed to resolve the problem.

Accordingly, there is a need for improved systems and methods for providing remote support for computing devices.

DETAILED DESCRIPTION

In the following description, reference is made to the accompanying drawings which illustrate several embodiments of the present invention. It is understood that other embodiments may be utilized and mechanical, compositional, structural, electrical operational changes may be made without departing from the spirit and scope of the present disclosure. The following detailed description is not to be taken in a limiting sense, and the scope of the embodiments of the present invention is defined only by the claims of the issued patent.

Systems and methods in accordance with various embodiments of the present disclosure provide improved systems and methods for remote support for computing devices in which live online video support sessions may be recorded for later playback. When these recorded support sessions are replayed, the control inputs generated during the original support session may be delivered to the user computing device to re-perform the same operations as in the original support session.

Figure 1:
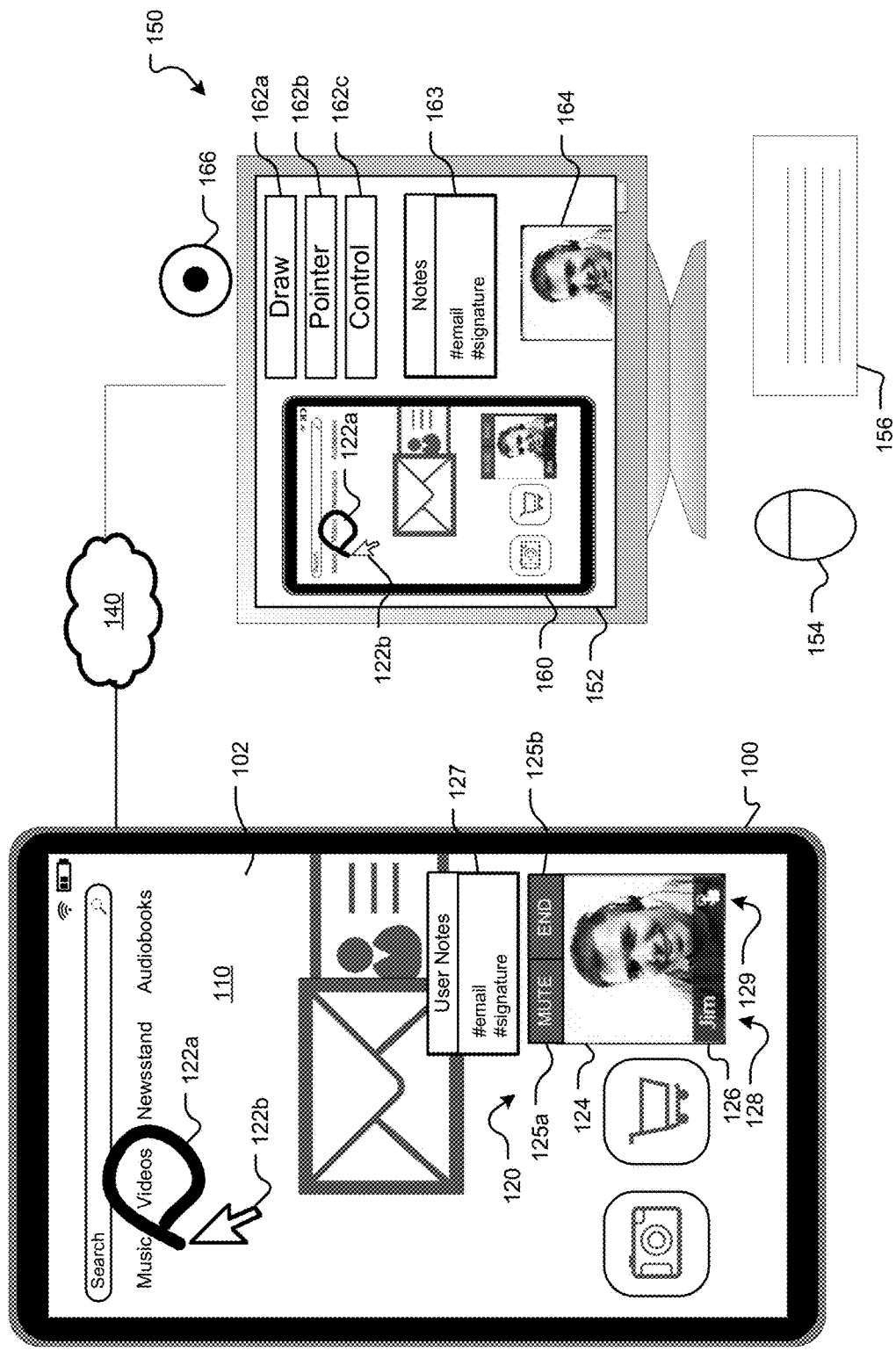
FIG. 1 is a block diagram illustrating a communication system, in accordance with embodiments of the present invention.

FIG. 1 is a block diagram illustrating a communication system, in accordance with embodiments of the present invention. A user utilizing a first computing device, such as a tablet computing device 100, connects to a second computing device, such as the customer support agent computing device 150, via a network 140. The network 140 includes, for example, the Internet, intranets, extranets, wide area networks (WANs), local area networks (LANs), wired networks, wireless networks, or other suitable networks, or any combination of two or more such networks.

The tablet computing device 100 includes a touch-sensitive display component 102, which produces user interface ("UI") content 110, such as an operating system user interface or the interface of one or more software applications that may run on the tablet computing device 100. When the user launches a customer support application on the tablet computing device 100 and initiates a screen sharing function, data representing the user interface content 110 currently being displayed on the tablet computing device 100 is transmitted to the support agent computing device 150. Data representing the user interface content 110 may include a copy of the user interface content 110, data representing pixel changes relative to a previous frame rendered as part of the user interface content 110, and/or any other type of data the support agent computing device 150 can process to render displays that show at least a portion of the user interface content 110 in near real-time. To avoid unnecessarily overcomplicating the discussion, reference to the user interface content 110 is often made herein where data representing the user interface content 110 could be referenced instead.

The support agent computing device 150 runs a customer support application, which then displays the screen sharing image 160 of the content 110 displayed on the user's computing device 100 on the agent's display 152. This screen sharing image 160 enables the customer support representative to better assist the user by presenting the representative with a live feed of the user's computing device 100. Many tablet computing devices are configured to dynamically change the user interface aspect ratio, depending on the orientation in which the device is held by the user. Therefore, the user interface may switch from portrait to landscape mode in the middle of a support session. The customer support application is configured to adjust the screen sharing image 160 to reflect the current orientation of the user computing device 100. Although the user interface for many desktop computers are configured to adjust from landscape to portrait mode, this adjustment is typically done much more frequently by tablet computer users due to the ease with which the orientation may be changed. In addition, many tablet computing applications only operate in a single orientation mode. Therefore, if the user is browsing an application menu in landscape mode, and launches a portrait-only application, the user interface (and screen sharing image 160) will automatically change to portrait mode.

The customer support application may also provide the agent with one or more support tools 162a-162c, which the agent may utilize to respond to the user's inquiries or requests for assistance. In the illustrated embodiment, the customer support application includes a drawing tool 162a, a pointer tool 162b, and a control tool 162c. The agent may utilize peripheral input devices of the agent computing device 150, such as, for example, a mouse 154 and a keyboard 156, to select one of the tools 162a-162c and then interact with the screen sharing image 160 using that tool to produce the desired result on the user's computing device 100.

The drawing tool 162a provides a graphics editor function that enables the agent to utilize one or more graphics tools to create graphical elements 122 to be displayed on top of the user's content 110. The graphics tools may enable the agent to draw freeform and/or non-freeform shapes, such as a line 122a, curve, or box, or to add text or other images. Data representing these graphical elements 122 can be transmitted as, e.g., raster or vector graphics images, to the user's computing device 100, where the graphical elements 122 are displayed on top of the user's content 110 on the user's computing device 100. The agent may use these graphical elements 122 to provide visual guidance to the user, such as to highlight a button to select or a touch input to perform. For example, if the agent wishes to instruct the user to swipe across a certain portion of the screen, the agent may use the drawing tool to draw a line in the direction of the swipe to be performed. The graphical elements 122 can be transmitted as a live, streaming feed to the user's computing device 100 as they are generated by the agent, so the user can see an animated display of the graphical elements 122. Accordingly, the user can view the line 122a being drawn, and thereby see the movement of the swipe across the display 102. In other embodiments, the graphical elements 122 may be transmitted as static images to the customer's computing device 100. These static images can be drawn by the customer support agent using the agent's computing device 150 and periodically transmitted to the customer's computing device 100 automatically or manually by the agent.

The pointer tool 162b provides the agent with a graphical element comprising a pointer 122b that the agent can move about the screen without leaving a trail or other persistent image, as would occur if using the drawing tool 162a. The agent may move the pointer 122b over the surface of the user's content 110 to draw the user's attention to various elements displayed. The pointer tool 162b provides a transient graphical element that the user can observe as it is manipulated by the agent, but does not leave a persistent image on the display 102. The pointer 122b can function in a similar fashion as the mouse pointer used in traditional graphical user interfaces for selecting items. However, when the user's computing device 100 is a touch-screen computing device, the operating system may be adapted to primarily or solely receive touch inputs, and not utilize a pointer cursor. Therefore, the pointer cursor may not be an integral function of the user's computing device 100. In addition, when the user's computing device 100 does provide for pointer functionality, it may be desirable for the customer support agent to have a separate pointer 122b controlled by the customer support agent, while enabling the user to simultaneously operate the user's pointer function, such as, for example, to carry out the instructions provided by the customer service agent. The ability to show the user what to do, and then permit the user to perform those tasks on his or her own can provide a much more effective training function than if the customer service agent were to perform those tasks directly.

In other situations, it may be desirable for the customer service agent to perform tasks directly on the user's computing device 100. The control input tool 162c provides the agent with the ability to produce inputs that are received by the user's computing device 100 and recognized as user inputs as if the user had provided those inputs using, for example, the touch-screen display 102. The control input tool 162c may provide the agent with a pointer or other cursor that the agent may move across the surface of the content 110 using the mouse 154, with touch inputs being generated using, for example, the buttons on the agent's mouse 154 or keyboard 156. The control input tool 162c may be useful when the agent wishes to perform functions or tasks directly onto the user's computing device 100, rather than merely explain to the user what the user should do, as may be the case when utilizing the drawing tool 162a or pointer tool 162b. This may be particularly desirable when the user does not wish to be trained on how to perform a task, but would rather have the task completed without effort on the user's part.

In some embodiments, it may be desirable for the customer service agent to be able to record information regarding the support session. The Notes field 163 permits the customer service agent to enter text or other information regarding the session. This information may be used, for example, to record the agent's notes regarding the session, such as the problem posed and the solution(s) attempted. This information may be searchable and viewable by other customer support agents when assisting the user or when assisting other users having similar problems. In some embodiments, the information is stored as short textual identifiers, e.g., a "tag," which may be a metadata keyword or term associated with the session, which helps describe the session and allows the session to be found again by browsing or searching, as will be described in greater detail below. In the illustrated example, the customer service agent has entered the metadata tags "#email" and "#signature" to record that the current session relates to the creation of a signature for e-mail messages. In other embodiments, the customer support agent may be presented with and permitted to select from a list of potential identifiers. In some embodiments, the customer support application may provide links to prerecorded solutions related to the session information entered into the Notes field 163.

In other embodiments, the customer support application may provide the customer support agent with other support tools not shown in FIG. 1. For example, the customer support application may include a library of pre-generated support graphics which may be selected by the customer support agent to be transmitted for display on the user's computing device 100. These pre-generated support graphics may comprise static images and/or animations. This may be particularly useful for teaching users the solutions to common problems. For example, after a user indicates that he needs assistance with connecting to a wireless network, the customer support agent may select a pre-generated graphic or animation that teaches the user how to access the appropriate settings menu for connecting to a wireless network. In some embodiments, the library of pre-generated support graphics displayed on the customer support application are selected based on information received from the user's computing device 100, such as the model type, operating system software running on the computing device 100, and orientation of the display (e.g., landscape or portrait). This may be useful when the sequence of steps and/or locations of menus and icons may vary between different device models, operating system revision level, and orientation of display. By utilizing this user information to select the appropriate pre-generated support graphics made available to the customer support agent, the customer support agent can provide a more precise and user-specific support experience.

In yet other embodiments, the support tools provided by the customer support application may include support graphics that provide guidance to the user on how to provide gesture inputs to the user's computing device 100. In conventional desktop computer operating systems, the user's inputs to the computer are limited by the inputs that may be provided by the keyboard and mouse. In touch-sensitive computing devices, more complex user inputs may be used when interacting with the computing device, including the use of multiple contact points (e.g., using 2, 3, or more fingers contacting the touch-sensitive display), different types of movements across the surface of the display (e.g., touches, swipes, pinches, reverse pinches), and different degrees of contact with the display (e.g., hovering over the display without contact, varying degrees of pressure on the surface of the display). These touch-based user inputs may be more difficult to illustrate using simple graphics, such as lines, circles, and arrows. It may be desirable for the customer support application to be provided with pre-generated support graphics that provide guidance on generating various user inputs. For example, one pre-generated support graphic to teach a reverse pinch input may comprise an animation of a thumb and index finger contacting the display and expanding outwards. The customer support agent may select this support graphic from a library of pre-generated support graphics, and position the support graphic onto a desired location in the screen sharing image 160 of the user's computing device 100. The user will then see the animated fingers on top of the UI content 110, showing the user how to touch the screen with his fingers to generate the desired input.

In yet other embodiments, different forms of communication between the customer support agent and the user may be provided. For example, the live chat between the customer support agent and the user may be text-based, without audio or video communication. Text-based communication may be more desirable in situations where data communications between then user and support agent is limited or expensive.

The support agent computing device 150 may also include a webcam 166 for capturing a live streaming video of the customer service agent using the computing device 150. The customer support application may include a video image 164 so that the agent, and the same image will be transmitted to the user's computing device 100 and shown in the video image portion 124 of an agent interface element 120. The agent interface element 120 may contain additional graphical elements and/or controls, such as, for example, a control portion 126. In the illustrated embodiment, the control portion 126 includes an information portion 128, displaying text, such as the agent's name, and one or more control icons 129, which, when selected by the user, can perform various functions. In this embodiment, if the user wishes to relocate the position of the agent interface element 120, the user can select the hand control icon 129 and drag the agent interface element 120 across the display. Additional controls 125*a*-125*b* may also be displayed to enable the user to perform additional functions, such as muting the live chat using mute control 125*a* and ending the support session using end control 125*b*.

In some embodiments, it may be desirable for the user to be able to record information regarding the support session. A User Notes field 127 may be displayed on the user's computing device 100 during or after the support session. Similar to the Notes field 163 utilized by the customer service agent, the user may enter text or other information regarding the session into the User Notes field 127. This information may be used, for example, to record the user's notes regarding the session, such as the problem posed and the solution(s) attempted. This information may be searchable and viewable by the user, other users, and/or other customer support agents when assisting the user or when assisting other users having similar problems.

Figure 2:
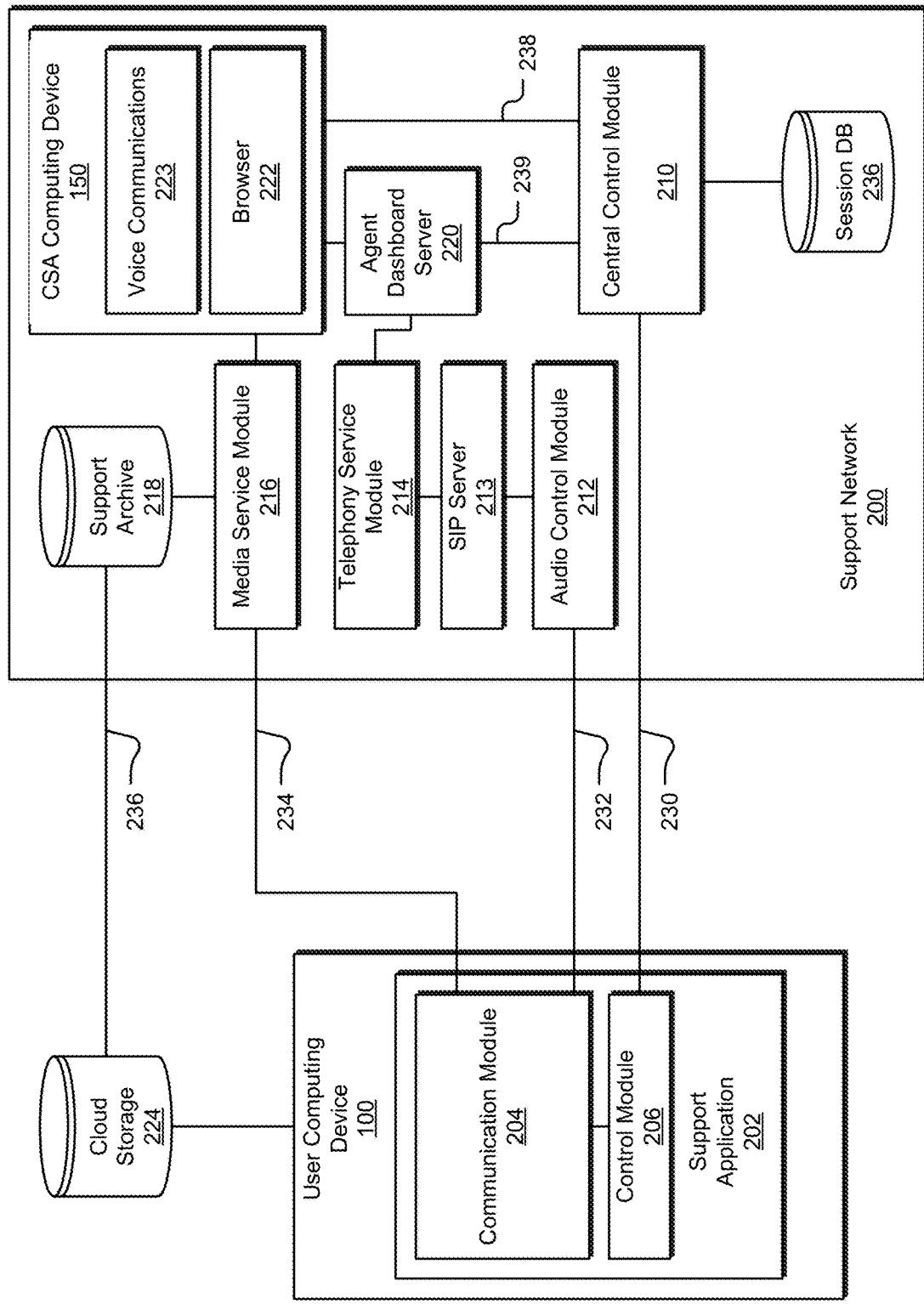
FIG. 2 is a block diagram illustrating an exemplary environment in which embodiments of the present invention may be implemented.

FIG. 2 is a block diagram illustrating an exemplary environment in which embodiments of the present invention may be implemented. The user's tablet computing device 100 is provided with a processing element and memory configured to execute various software applications, including a support application 202 comprising a communication module 204 and a control module 206. The support agent computing device 150 is provided as part of a support network 200, which includes a central control module 210, an audio control module 212, a Session Initiation Protocol (SIP) server 213 (or other communications server), a telephony service module 214, a media service module 216, a support archive 218, and an agent dashboard server 220. The support agent computing device 150 also includes a processing element and memory configured to execute various software applications, including a web browser application 222. The support agent computing device 150 may also include a voice communications module 223, which may include a voice communications headset or other microphone and speaker hardware, and corresponding software for handling voice communications between the agent computing device 150 and the user computing device 100. Although various components are illustrated as discrete blocks in FIG. 2, it is to be understood that the blocks are merely illustrative and the functionality of each component may be implemented using software executing one or more computing devices, such as a series of servers located in different physical locations.

The user computing device 100 may include a Linux-based operating system, such as the Android operating system by Google, Inc., and the support application 202 may comprise a browser-based software application operating in the applications layer of the operating system. The communication module 204 may implement, for example, a protocol for browser-based real-time communication, such as WebRTC. The communication modules 204 enables the real-time one-way or two-way media streaming between the browser-based support application 202 running on the user computing device 100 and the browser application 222 on the support agent computing device 150. When the user computing device 100 is running the Android operating system, the communication module 204 may utilize a WebView element to render the graphical content provided by the support agent computing device 150 and displayed on top of the UI content 110.

The central control module 210 may comprise a management application running on a computer server in the support network 200. The central control module 210 handles control and communication between a plurality of user computing devices and support agent computing devices, and other components of the support network 200. When a user launches the support application on a computing device (e.g., support application 202 on computing device 100), the support application 202 establishes a connection with the central control module 210 via a session control channel 230. The central control module 210 initiates a new support session and transmits the session information to the agent dashboard server 220 via communications channel 239. The communications channel 239 is used to transmit session status and control information to the support application 202 and may also be used to receive information to initiate an audio communication session between the user computing device 100 and the agent computing device 150. The agent dashboard server 220, in turn, assigns the new support session to one of the customer support agent computing devices (e.g., customer support agent computing device 150). The central control module 210 stores information regarding all of the customer support sessions provided by the support network 200 in session database 236. The central control module 210 also maintains an agent control channel 238 with the agent browser 222. The agent control channel 238 may be used to transmit graphics between the user computing device 100 and the agent computer device 150 and may also be used to transmit signal information to establish the media session between the user computing device 100 and the agent computing device 150.

The audio control module 212 manages the voice communication between the user computing device 100 and the agent computing device 150. The audio control module 212 may comprise a session border controller (SBC) to manage Voice Over IP communications between the user computing device 100 and the agent computing device 150, including management of quality of service (QoS) parameters, such as rate limiting, bitrate management. The audio control module 212 receives the voice data via audio channel 232 and passes the voice data to the telephony service module 214. The telephony service module 214 then routes the voice communication to the corresponding agent computing device 150 via the agent dashboard server 220. The audio channel 232 can establish the voice session using a signaling communications protocol such as the Session Initiation Protocol (SIP) and a transport protocol such as the Real-time Transport Protocol (RTP).

The media service module 216 handles the graphical media streaming between the user computing device 100 and the agent computing device 150. The media service module 216 may be implemented as a computer server implementing a Traversal Using Relays around NAT ("TURN") protocol for handling data over TCP and UDP connections. The graphical media streaming handled by the media service module 216 can include one or more of the screen sharing graphics from the user computing device 100, the graphical elements 122 from the agent computing device 150, and the video image 164 of the agent. The media streaming between the communication module 204 and the media service module 216 via WebRTC can be provided over a media channel 234. In some embodiments, the graphical elements 122 from the agent computing device 150 may be transmitted from the central control module 210 to the control module 206 on the user computing device 100 via session control channel 230.

The support archive 218 comprises a storage system that can be used to store all of the media exchanged during a customer support session between the user computing device 100 and agent computing device 150. The stored media may be used for training and audit purposes, such as to review the performance of the various customer service agents in the support network 200. In accordance with some embodiments of the present invention, the stored session data may be made available to the user so that the user may review a recording of a previously-held customer support session. This can be particularly helpful to users who wish to review the instructions provided by the customer service agent. In some embodiments, after a customer service session is completed, the stored session data, including one or more of the audio, video, screen sharing, and graphical elements from the agent, may be transmitted to the user's cloud storage server 224, for later retrieval and playback by the user. The stored session data may be stored as a video file that can be played back and viewed by the user exactly as the user had experienced it live during the customer service session.

Communication Prioritization

In accordance with embodiments of the present invention, a customer support agent at computing device 150 may have multiple simultaneous modes of communication with the user at computing device 100, and the transmission of one or more of those multiple modes of the communication may be prioritized over the other modes of communication, depending on the adequacy of the network communications between the user computing device 100 and the agent computing device 150. As described above, those communication modes may include voice communication via audio channel 232, screen sharing of the user computing device 100 to the agent's computing device 150 via media channel 234, graphical elements generated by the customer service agent and transmitted to the user computing device 100 via session control channel 230, and streaming video images of the customer service agent captured by the webcam 166 and transmitted to the user computing device 100 via medial channel 234.

In some embodiments, it may be desirable that the voice communication between the user and the agent be provided with a higher priority than the other modes of communication. In many situations, maintaining reliable voice contact is the most effective way of providing customer service, and degradation in voice communications can be particularly frustrating for the end user. Accordingly, when a reduction in quality in data communications between the computing device 100 and computing device 150 is detected, the transmission parameters for one or more of the other modes of communication may be modified, temporarily suspended, or terminated, so as to preserve the quality of the voice communication.

The session control channel 230 may be used to communicate detected changes in communication quality and/or to communicate adjustments in transmission parameters for the one or more other modes of communication. Most communication protocols include some form of quality detection methods, which may monitor different aspects of the communication, such as, for example, service response time, loss, signal-to-noise ratio, cross-talk, echo, interrupts, frequency response, loudness levels, bit rate, etc. The quality detection method may also comprise feedback from the user or agent regarding their respective perceptions of communication quality. Quality status detected by the agent's browser 222 can be communicated to the central control module 210 via the agent control channel 238, and quality of service status detected by the user's support application 202 can be communicated to the central control module 210 via the session control channel 230.

The central control module 210 may be configured to monitor the communications between the user computing device 100 and the agent computing device 150 to maintain a minimum level of communications quality. In some embodiments, if the quality of voice communication drops below a predetermined level, then the transmission parameters of one or more of the other modes of communication is adjusted. In other embodiments, if the quality of communications on one or more of the modes of communication drops below a predetermined level, then the transmission parameters of one or more of the other modes of communications can be adjusted in accordance with a predetermined prioritization order. For example, the voice communications may be assigned the highest prioritization, followed by the user computing device screen sharing, followed by the graphical elements from the agent support tools, with the agent video streaming having the lowest priority.

Various mechanisms may be used to adjust the transmission parameters of the modes of communication. For example, the bit rate of one or more of the non-voice communications modes may be reduced. Alternatively, other methods may be used to modify the communication parameters, such as, for example, adjusting the frame rate or changing the codec.

The changes in communication parameters to prioritize one or more communication modes may be initiated by the central control module 210 based on quality measurements sent by either the user computing device 100 over session control channel 230 or the agent computing device 150 over agent control channel 238. The instructions for adjustments to be made to the communication parameters are then transmitted by the central control module 210 back to the user computing device 100 over session control channel 230 or the agent computing device 150 over agent control channel 238, or both, depending on the type of parameter being changed. In cases where only one of the computing devices 100 or 150 controls the transmission parameters, the instructions may transmitted to only that device to implement the desired transmission parameter change so as to prioritize the voice communications between devices 100 and 150. In other cases, the instructions may be transmitted to both endpoints of the communication, e.g., user computing device 100 and agent computing device 150, so that each device may make the desired adjustment.

Support Content Overlay

Figure 3:
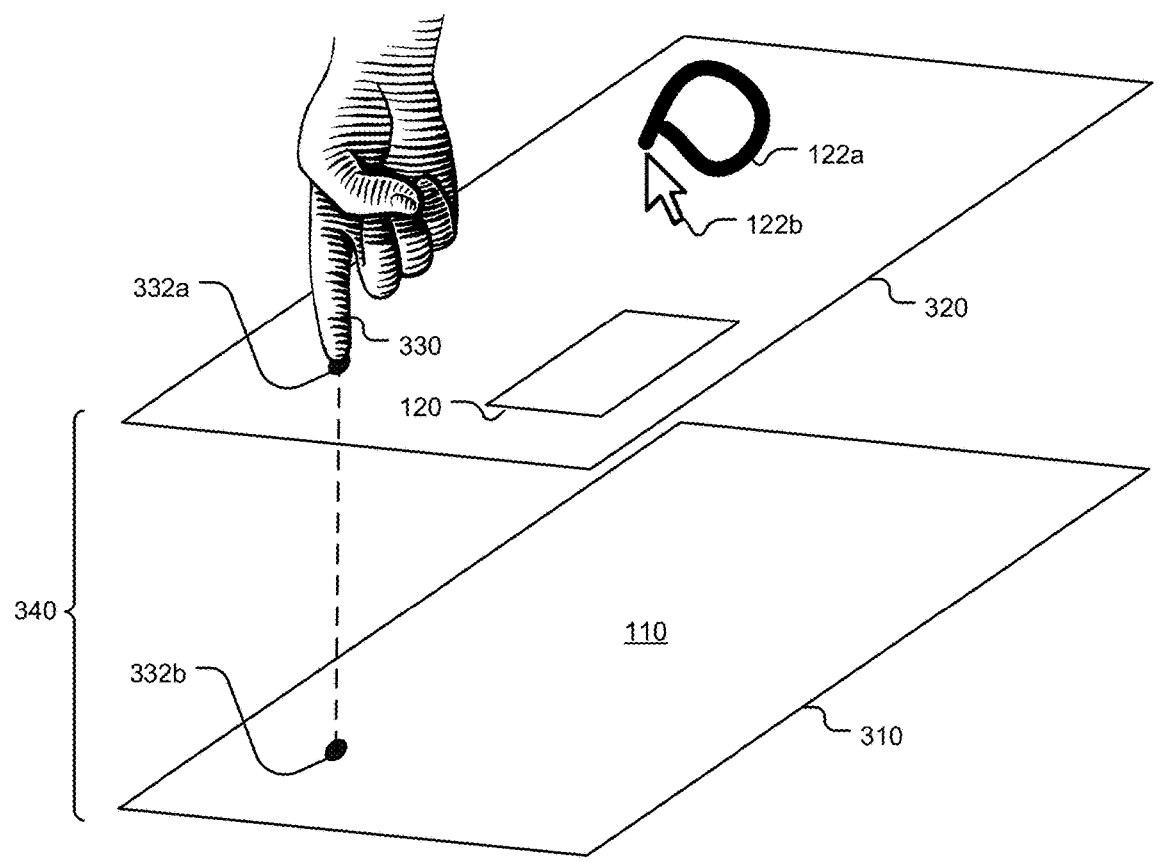
FIG. 3 illustrates the detection of touch inputs in a support session interface, in accordance with embodiments of the present invention.

FIG. 3 illustrates the detection of touch inputs in a support session interface, in accordance with embodiments of the present invention. As described above, a customer support agent at computing device 150 may generate graphical elements that are transmitted to the user computing device 100 to be displayed on the user computing device 100 on top of the user's user interface content 110. These graphical elements may be used by the agent to communicate with the user for customer support, troubleshooting, training, or other communication purposes.

During normal operation of the user computing device 100, the display component 102 displays UI content 110 in a UI layer 310. The UI layer 310 may comprise, for example, a window or frame filling all or a portion of the display area of the user computing device 100. The UI content 110 displayed in the UI layer 310 includes, for example, the operating system user interface or the interface of one or more software applications running on the user computing device 100.

When the customer support application is initiated, a support session interface 340 is displayed by the display component 102. The support session interface 340 may include multiple logical layers, with the content in each layer being combined and rendered in the support session interface 340. In the embodiment illustrated in FIG. 3, a support content layer 320 is generated and displayed on top of the UI layer 310 in the support session interface 340. The support content layer 320 is transparent, so as to enable the user to view all of the content displayed in the UI layer 310 through the support content layer 320. However, any graphical elements generated by the agent computing device 150 and transmitted to the user computing device 100 are displayed in the support layer 320. These graphical elements may be partially transparent, thereby enabling the user to view the content in the UI layer 310 below, or opaque, thereby blocking the view of the content in the UI layer 310 below.

In the example described above with respect to FIG. 1, the agent interface element 120 displays a video image portion 124, an information portion 128, and controls 125*a*-125*b*. As shown in FIG. 3, the graphical content of the agent interface element 120 is rendered in the support content layer 320. Additional graphical elements created by the customer support agent may also be displayed in the support content layer 320, such as a pointer 122*b*, lines 122*a*, or other graphical elements created by the customer support agent for display on the user's computing device 100.

It may be desirable to permit the user to continue to interact with the elements displayed in the UI layer 310, even when the support content layer 320 is displayed overlaying the UI layer 310. On touch-enabled computing devices, the user may interact with the elements displayed on the computing device by touching one or more fingers 330 to the display. The contact of the finger 330 to the display is detected as a touch input by the computing device 100. When a transparent support content layer 320 is displayed on top of the UI layer 310, the user's touch input 332*a* may be detected by the computing device's hardware and passed to software producing the support content layer 320 (e.g., the support application 202) as an input command or input event. When the touch input 332*a* corresponds to a portion of the support content layer 320 that does not contain any control elements, the touch input 332*a* is forwarded from the support application 202 to the software producing the UI layer 310 (e.g., the computing device's operating system or software application) as a touch input 332*b* to the same location on the display as the original touch input 332*a*.

In this way, the user may continue to interact with the underlying UI content displayed in the UI layer 310 while the support agent is providing support to the user. This may be particularly useful when the support agent is teaching the user how to perform an operation. The support agent may create graphical elements, such as lines 122*a* or pointers 122*b*, on the user's display to direct the user to the appropriate element, control, or relevant portion of the UI content, while simultaneously guiding the user via voice communications. In some embodiments, it may be desirable for the user to passively observe the support agent's control of the user's computing device 100. However, in other embodiments, it may be desirable for the user to interactively follow the support agent's graphical, textual, and/or audio guidance to perform the desired tasks.

In accordance with embodiments of the present invention, audio communications between the user and the customer support agent may be provided via a telephone call from the user's residential telephone system or mobile telephone. The telephone call between the user and the customer support agent may be initiated before or after the support application 202 is launched on the user computing device 100 and the customer support session is initiated between the user computing device 100 and the agent computing device 150.

In order to initiate a telephone call to a customer support agent before launching the support application 202, the user may dial a predetermined customer service number using any conventional telephone system or telephone network. If, during the course of that telephone call, the user launches the support application 202, the existing telephone call between the user and the support agent will be associated with the customer support session initiated between the user computing device 100 and the agent computing device 150. This association may be established automatically by the central control module 210 when the support application 202 initiates the support session if the user has already provided identifying information during the telephone call. This identifying information may comprise a user login, device name, telephone number associated with the user computing device 100, or other information that may be used to uniquely identify the user computing device 100, and may be provided manually using telephone keypress entries, verbally to the support agent, or automatically via caller identification. The central control module 210 can then route the support session request from the support application 202 to the agent computing device 150 of the customer support agent already on the telephone with the user. The user and the customer support agent may then continue the telephone call in conjunction with the screen sharing and graphical support content described above.

Alternatively, the support agent may verbally convey telephone session identifying information to the user. The user may then manually enter this telephone session identifying information (such as, e.g., a session identification number) into the support application 202 when initiating the support session. The central control module 210 can use this telephone session identifying information to route the support session to the customer support agent already on the phone with the user.

In other embodiments, the user may initiate the support session between the user computing device 100 and the agent computing device 150 before a telephone call is established with the customer support agent. This may be desirable when the user computing device 100 does not support bidirectional audio communications (e.g., the user computer device 100 does not have a microphone or voice communications capability) or if the network connectivity is inadequate to support a reliable voice communication session. After the user launches the support application 202, the user may be prompted to select whether the user wishes to establish voice communications with the support agent via the user computing device 100 or via a separate telephone call. If the user selects a telephone call, the user may be prompted to enter a telephone number where the user may be contacted, or the user may be provided with a telephone number for contacting the customer support agent.

Recording and Replay of Support Sessions

Figure 4A:
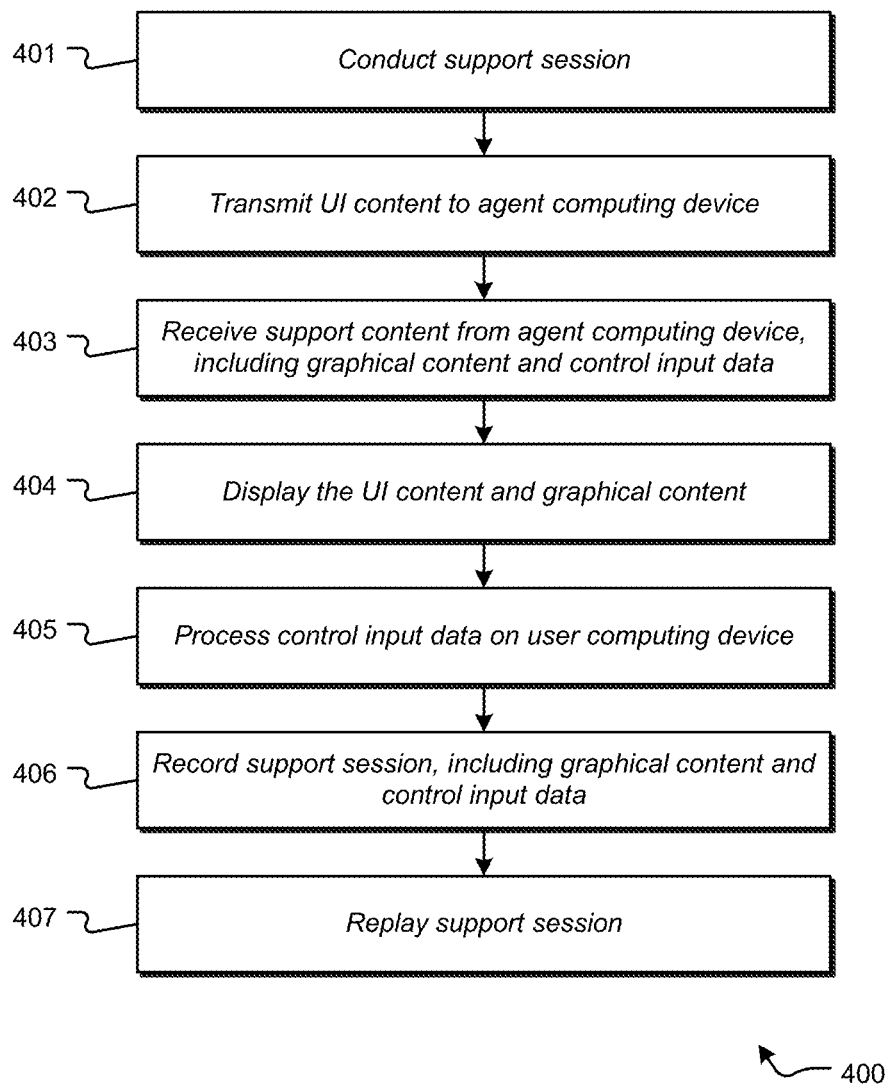
FIGS. 4A-4B are flowcharts illustrating methods of providing remote support, in accordance with embodiments of the present invention.

In accordance with embodiments of the present invention, methods and systems for recording and replaying customer support sessions are provided. FIG. 4A is a flowchart illustrating a method 400 of providing support, in accordance with embodiments of the present invention.

In step 401, a support session is conducted in which user interface ("UI") content is transmitted from a user computing device to an agent computing device in step 402. In step 403, support content is received from the support agent computing device. This support content includes, for example, data representing graphical content and control inputs. In step 404, the UI content and support graphical content are displayed on the user computing device. In step 405, the control inputs are processed on the user computing device to cause the user computing device to perform one or more operations in response to those control inputs. In step 406, the support session is recorded, including the graphical content and control inputs. In step 407, at a later point in time, the recorded support session is replayed. The replaying of the recorded support session includes re-displaying of the graphical content and reprocessing of the control inputs.

FIGS. 5A-5F are illustrative portions of UI screenshots of a support session that can be conducted, recorded, and replayed in accordance with embodiments of the present invention. In this case, a user may launch a customer support application as described above with respect to FIG. 1, and request that the customer support agent assist the user with performing a desired operation. This operation may comprise any function, task, setting change, or other interaction with the user computing device 100. In the embodiment illustrated in FIGS. 5A-5G, the user is requesting assistance with changing the automatic signature text for e-mail messages. The user may request this assistance, for example, by entering a text-based message into the customer support application or, if audio communications between the user and agent are available, speaking the request out loud.

Figure 5A:
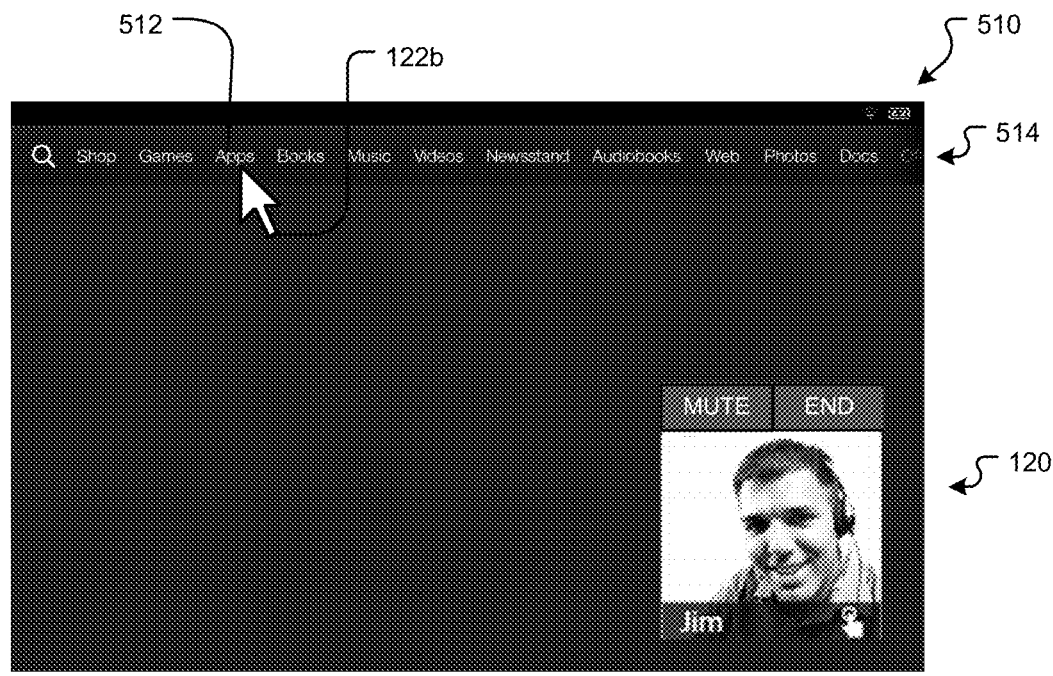
FIGS. 5A-5G are illustrative screenshots of a support session that can be conducted, recorded, and replayed in accordance with embodiments of the present invention.
Figure 5B:
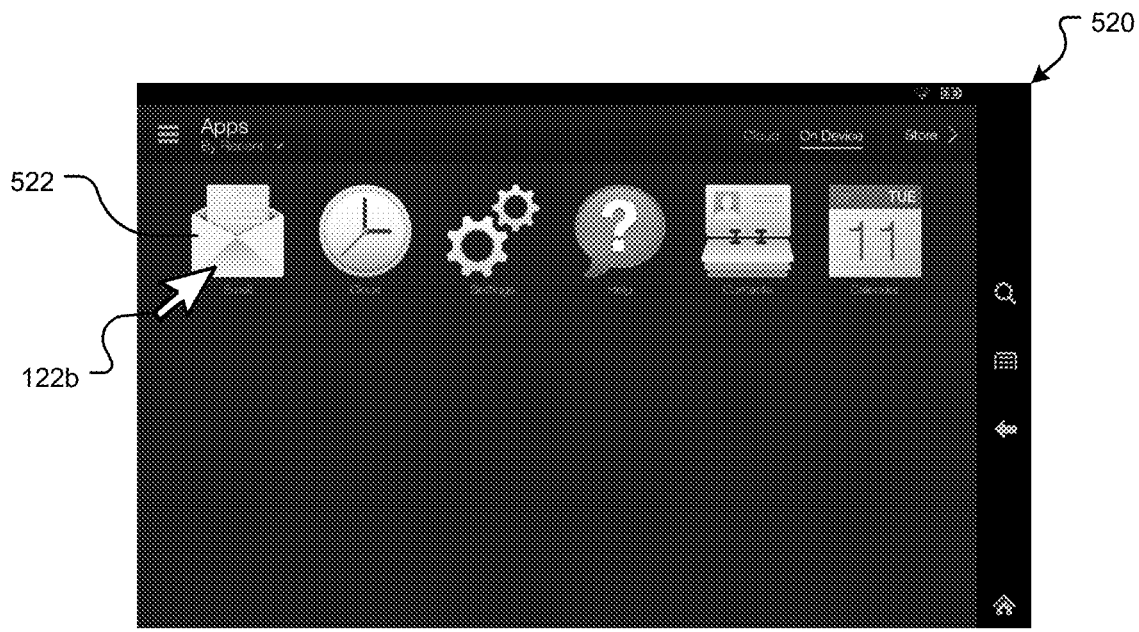

In response to the user's request, the customer support agent may then begin a support session in which support content is provided to the user computing device 100. The support content may include graphical content. As shown in FIG. 5A, the graphical content comprises a pointer 122b, which the customer support agent (an image of whom is shown in agent interface element 120) may animate to move across the screen 510 currently being displayed on the user computing device 100 to draw the user's attention to graphical elements in the screen 510. In FIG. 5A, the pointer 122b is pointing to the "Apps" icon 512 in the menu bar 514 on the home screen. In some cases, the customer support agent may instruct the user to tap the "Apps" icon 512 to cause the device 100 to navigate to the application library screen 520, as shown in FIG. 5B. In other cases, the customer support agent may generate the touch control input and transmit input data representing that touch control input to the user computing device 100 to remotely cause the device 100 to navigate to the application library screen 520 without interaction by the user.

After the device displays the application library screen 520, the customer support agent positions the pointer 122b over the e-mail application icon 522 to indicate that the e-mail application icon 522 should be selected next. Again, the control input to produce the touch event on the e-mail application icon 522 may be generated either directly by the user or by the remote customer support agent. This touch event causes the device 100 to launch an e-mail application.

Figure 5C:
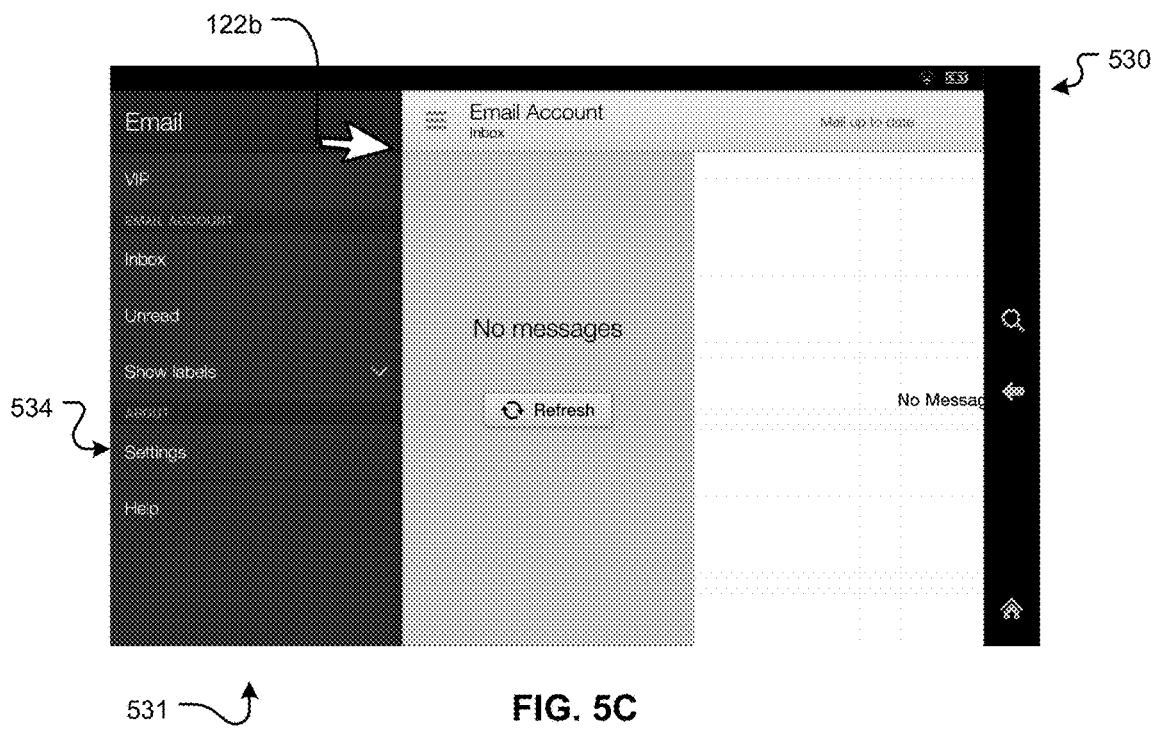
Figure 5D:
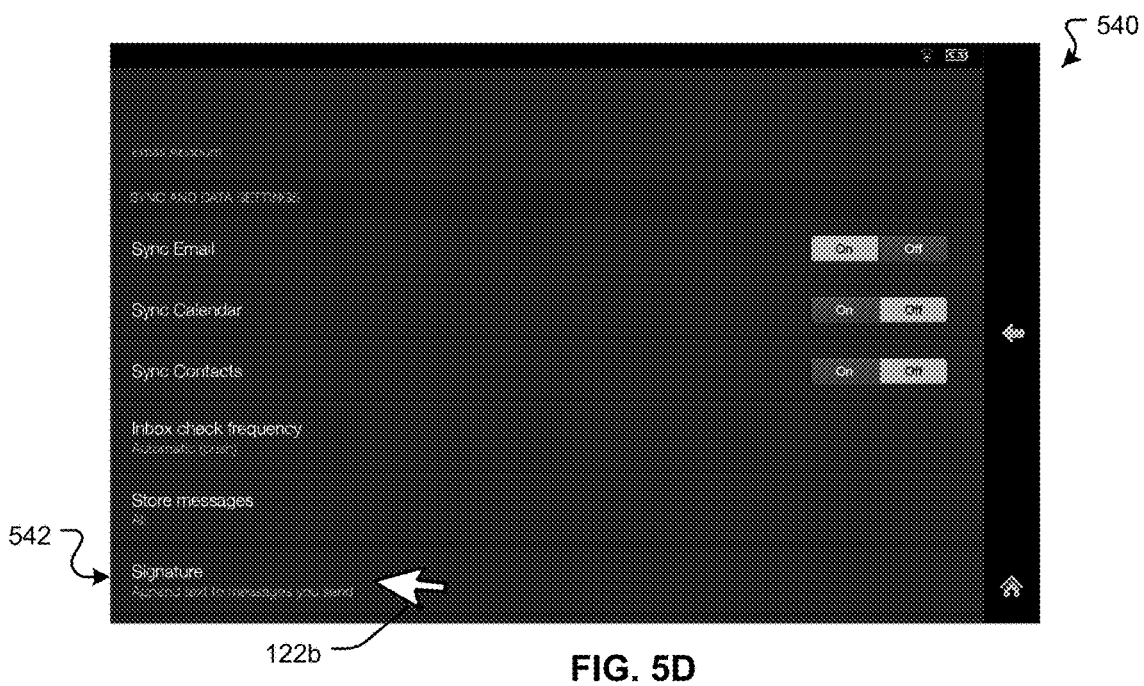

FIG. 5C illustrates the e-mail application screen 530 which is launched after selection of the e-mail application icon 522 in FIG. 5B, and after the customer support agent has instructed the user to swipe from the left edge of the screen towards the right to display the e-mail application's Menu 531, using, for example, the pointer 122b as described above. The user or customer support agent may then generate a touch control input to select the Settings button 534, which causes the device 100 to launch the Settings menu screen 540, as shown in FIG. 5D.

Figure 5E:
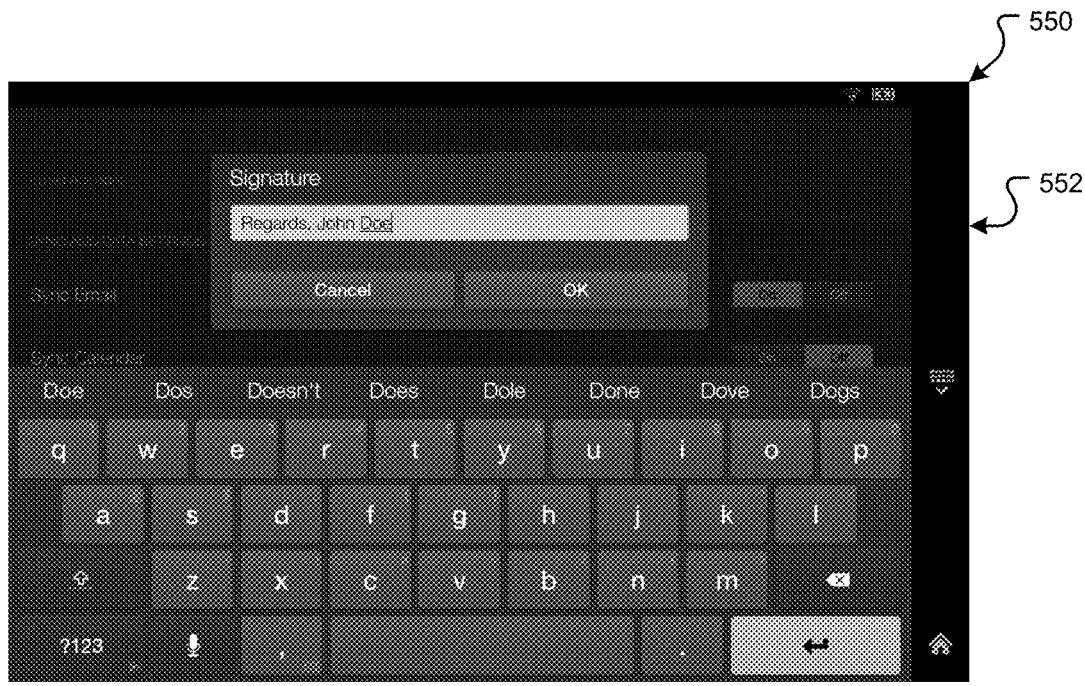

When the Settings menu screen 540 is displayed, the customer support agent may use the pointer 122b and/or voice instruction to instruct the user to scroll down through the Settings menu until the Signature icon 542 is displayed. The upward swipe input to scroll downwards may be generated by the customer support agent or by the user in response to the agent's instructions. The pointer 122b can then be used to instruct the user to select the Signature icon 542, thereby causing the device to launch the Signature Window screen 550, as shown in FIG. 5E.

The Signature Window screen 550 includes an input field 552 in which the user may type the desired e-mail signature. Alternatively, the customer support agent may enter the desired text remotely.

Figure 5F:
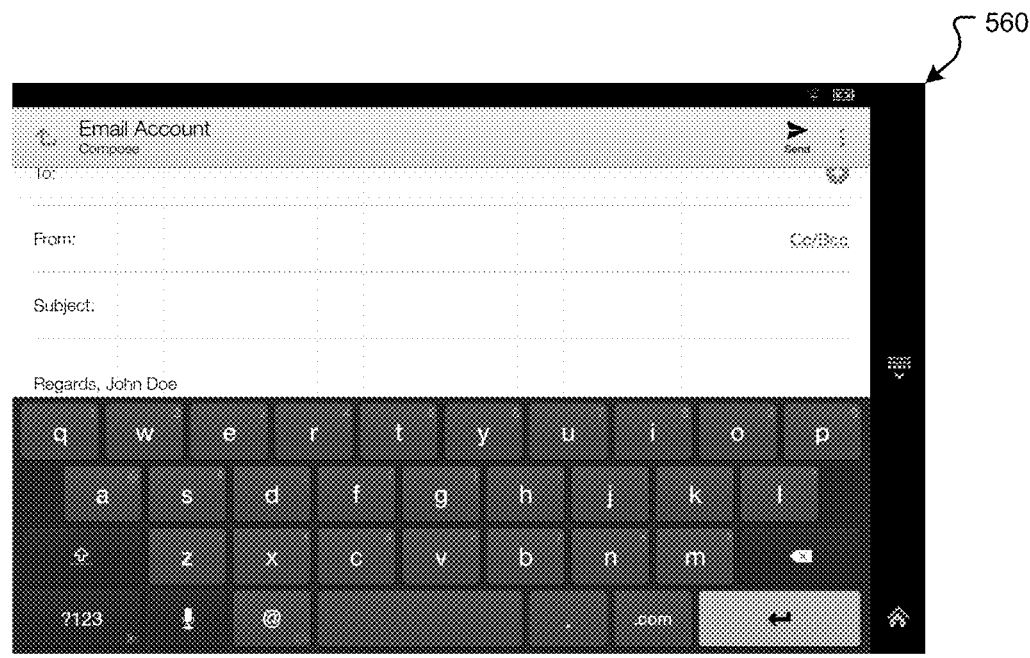

Finally, the customer support agent may demonstrate to the user how to create a new e-mail message with the newly-created e-mail signature, as shown in the e-mail composition screen 560 in FIG. 5F.

In accordance with embodiments of the present invention, the support session may be recorded for later playback. As described above, the support content in the support session may include multiple media types, including graphical elements, animations, video, and audio, as well as inputs. All or a portion the support content may be recorded and stored either locally on the user's device 100 or on a remote server, such as, e.g., support archive 218.

In addition to the storing the support content, metadata regarding the support session may also be recorded with the support content for that support session. Any type of information may be stored in the metadata, such as, for example, information regarding the user computing device (e.g., device model, operating system type and version, software application version), operations performed during the support session, and tags or other identifiers entered by the customer service agent and/or user. The metadata may be used to index and retrieve the recorded support session for later playback, as will be described in greater detail below.

In the portion of the support session shown in FIG. 5A, the graphical content, including the pointer 122b and its movement across the screen 510, may be recorded. Any audio or video of the customer support agent provided while manipulating the pointer 122b may also be recorded and synchronized with the graphical content. In addition, the control input data may also be recorded. For example, the touch input on the Apps icon 512 may be recorded. The control input data corresponding to that touch input may include any of a variety of information regarding the input, such as, for example, the location of the touch input in the display region (e.g., the X-Y coordinates of a touch in the display region, or the X-Y path of touches in a touch gesture), the screen elements that were selected by that touch (e.g., the Apps icon 512), and the types, location, and direction of touch gestures.

When the support session is later retrieved and replayed, the user may have the option to view a passive recording of the support session, including the graphical content and agent audio and video. The replaying of this passive recording may display the graphical content as well as the content of the user's screen during the support session, but will not provide an control inputs to the user computer device during the replay.

Alternatively, the user may have the option to view an active recording of the support session, in which the recorded control input data is received by the user computing device as control inputs at the time of the replay. As a result, if the user later wishes to change the e-mail signature but has forgotten the instructions provided during the customer support session described above, the user may retrieve and replay the recorded customer support session. If a passive replay is selected, the user may passively view the replay of the support session to relearn the steps required to change the e-mail signature. Then, after the replay is completed, the user, with the refreshed instruction, may be able to perform the desired operation. Alternatively, if an active replay is selected, the recorded control inputs are received by the user computing device such that the active replay will cause the user computer device to re-perform the operations shown in FIG. 5A-5F that were previously performed when the support session was originally recorded.

In some embodiments, an upgrade path may be provided to enable recorded support sessions for performing operations on older versions of the device software to be re-used. For example, UI elements such as buttons and menus may be repositioned in later versions of an operating system or software application. If the control inputs are recorded as locations of touch inputs in the display region, then the upgrade path will reposition the location of the touch input to reflect the repositioned UI element that was selected during the original support session. Alternatively, if the control input data records the UI element that was originally selected, the upgrade path will modification the location of the touch input to select the repositioned UI element. The upgrade modifications may be generated at the time of replaying of the recorded support session, based on the detected versions of the current operating system or software application. Alternatively, the recorded support sessions may be modified for future versions of software at the time of release of that version of the software, and the modified support sessions can be recorded for later replay.

In embodiments described above, the recorded input data corresponds to user inputs, such as touch events or text entries. In accordance with other embodiments of the present invention, different types of inputs may be generated by the support agent and received by the user computing device 100. Any type of input that may be received by the device 100 may be simulated by the inputs provided by the support agent. For example, in devices 100 having global positioning system (GPS) functionality, simulated GPS data may be delivered to the device 100 as input data. This simulated GPS data will be received by the device 100 and processed as if the device's GPS module was detecting the GPS positioning information. As a result, a remote customer support agent may be able to remotely activate a navigation application on the device 100 and simulate geographic movement of the device 100. This will cause the navigation application to display navigation map content to the user as if the user was travelling through the simulated GPS coordinates.

In other embodiments, the simulated input data provided by the customer support session may simulate the data received by a peripheral, such as a wireless peripheral. Many users experience difficulty when attempting to pair a computing device with a wireless peripheral, such as a headset, mouse, speakers, or other peripheral configured to communicate using, for example, a short range wireless communication protocol such as the Bluetooth standard, or a printer, storage device, or other peripheral configured to communicate using a wireless local area network protocol, such as WiFi (IEEE 802.11). It may be desirable for a customer support agent to assist a user with the pairing process. If the actual peripheral device is unavailable, the customer support session may deliver simulated data to the user computing device which corresponds to data that would be received by the device's wireless radio during the pairing process. In this way, the customer support agent may demonstrate to the user all of the steps involved with pairing the peripheral, even when the peripheral is unavailable. This instruction may be sufficient for the user to be able to pair the computing device by him or herself once the peripheral becomes available. Alternatively, the user may choose to replay the customer support session so as to receive the instruction again. In this case, the simulated peripheral data that was delivered during the original customer support session may be omitted from the replayed session. This omission may be manually selected by the user, such as by prompting the user at the beginning of the replayed session to choose whether to utilize the simulated data again. Alternatively, the simulated data may automatically be omitted during any replay or may be omitted if the device detects the presence of a peripheral corresponding to the peripheral that was the subject of the original support session.

Mobile computing devices currently on the market often incorporate multiple sensors to detect various conditions of the device. Some commonly used sensors include, for example, accelerometers, gyroscopes, compasses, ambient light sensors, proximity sensors, and barometers. In accordance with other embodiments, the inputs may correspond to any type of sensor data that the device 100 may receive. As a result, simulated sensor data may be delivered to the device 100 to cause the device to respond as if the device was actually experiencing those conditions. For example, if the user computing device 100 is failing to adjust the screen brightness in response to changes in the ambient light, a customer support agent may transmit ambient light sensor inputs to the device 100 to cause the device 100 to respond as if there were no ambient light. This can help the customer support agent troubleshoot and diagnose problems the user may be experiencing.

One popular use of computing devices is for playing video games. In many video games, users must complete various challenges or obstacles in order to proceed to subsequent levels. In accordance with embodiments of the present invention, the recorded support sessions may be used to record and replay successful completion of challenges in video games. For instance, if a particular game has a puzzle to be solved or an opponent to defeat in a fighting game, the recorded support session may record the user inputs necessary to solve the puzzle or defeat the opponent. These user inputs may include, for example, touch events, gaming controller inputs, accelerometer, gyroscope, or other sensor inputs, or the like. Users who have successfully completed these challenges may make their recorded sessions available to other users, e.g., for free in an open library or for a fee.

Support Session Library

In accordance with embodiments of the present invention, multiple support sessions may be recorded and stored in a support session library. This library may be user-specific, thereby providing a user with access to that user's previous support sessions. Alternatively, the library may be open, so that users may search and view recorded support sessions for other users or recorded support sessions intended for general use (e.g., a recording of a customer support session that did not have an actual user receiving support). The library may include various forms of indexing to improve the users' ability to locate recorded support sessions of interest. For example, the metadata associated with each support session may be indexed, so that users may search for recorded support sessions relating to, e.g., particular tasks, operations, software applications, and devices.

Figure 4B:
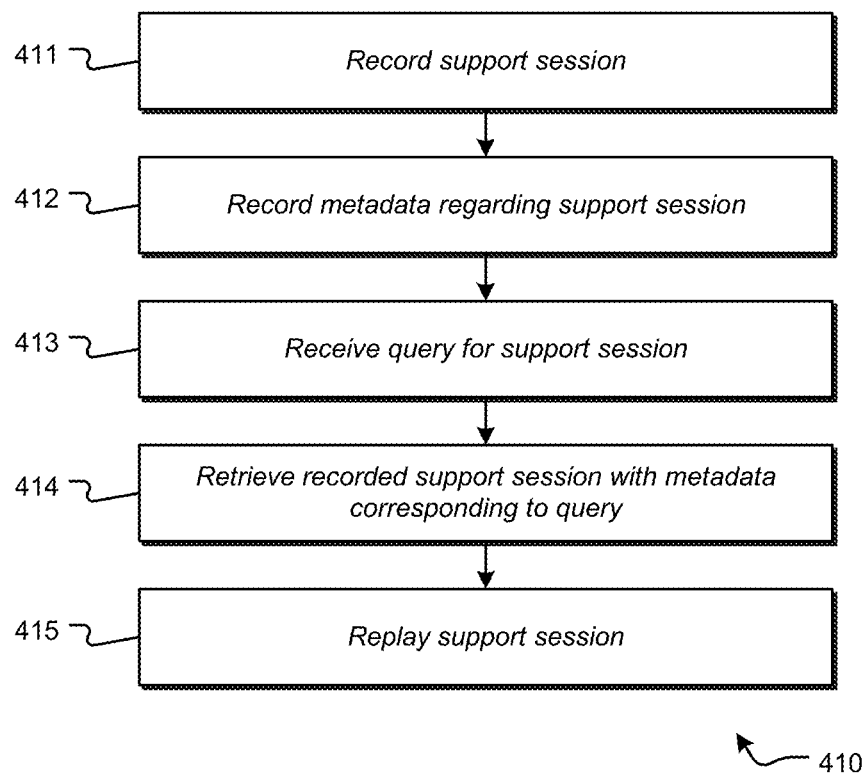

FIG. 4B illustrates a method 410 of delivering recorded support sessions, in accordance with embodiments of the present invention. In step 411, a support session, such as the sessions described above, is recorded. In step 412, metadata regarding the support session is recorded and associated with the recorded support session. In step 413, a query is received for support session content. In step 414, a recorded support session matching the query is retrieved. In step 415, the recorded support session is replayed.

Figure 5G:
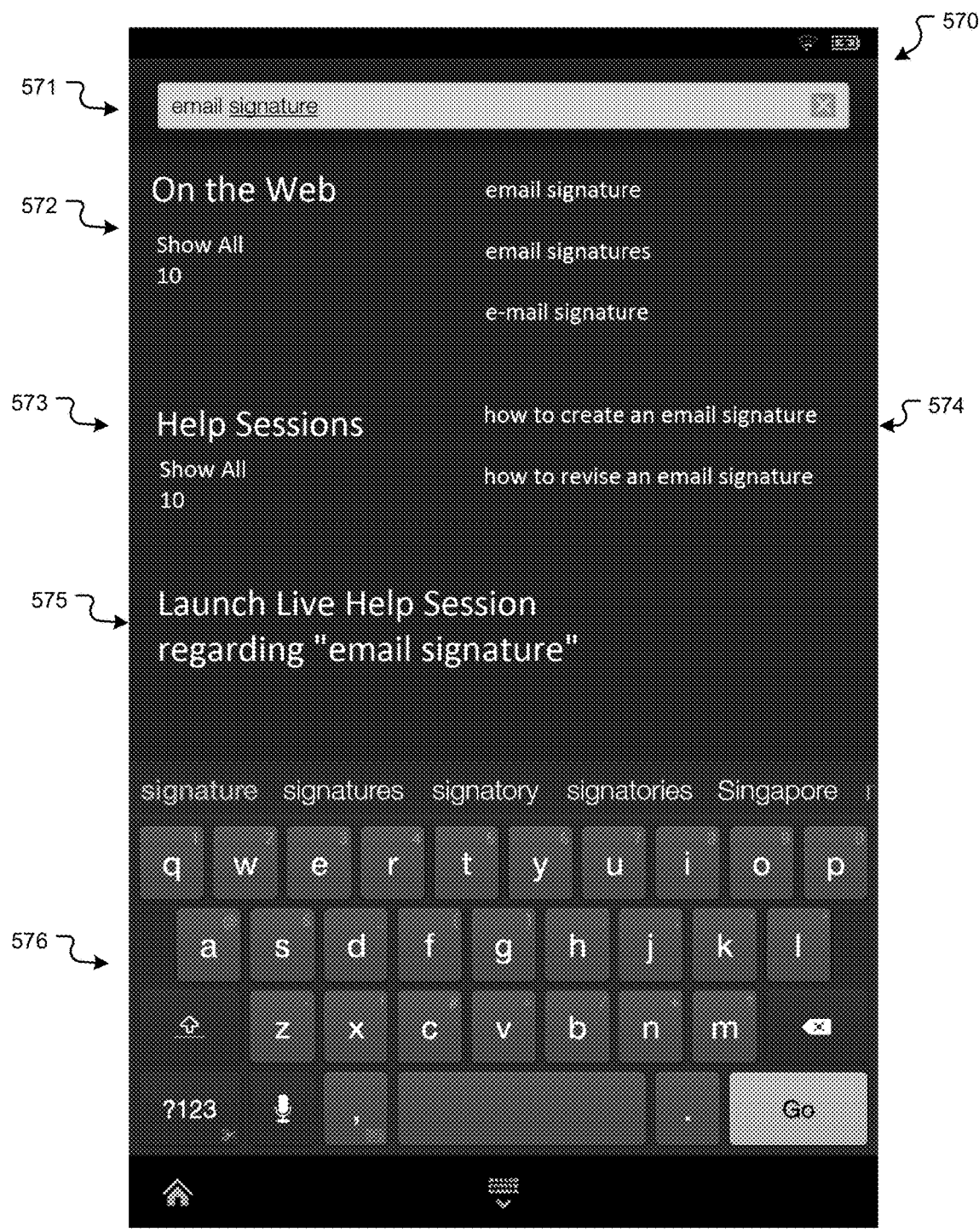

FIG. 5G illustrates a screen 570, in which a user may search for customer support sessions by utilizing a search tool. In the screen 570 shown in FIG. 5G, the user may utilize the onscreen touch keyboard 576 to enter a keyword query into a search box 571. In some embodiments, the search box 571 provides a universal search that queries multiple sources with a single search query. In the illustrated embodiment, the query "email signature" causes the computing device 100 to display two sets of results: Web Search results 572 and Help Session results 573. The Web Search results may query any of a variety of known web search engines to retrieve hits corresponding to the search query. The Help Session results 573 may search a database of existing recorded customer support sessions. These sessions may be retrieved from any of a variety of sources, such as the user's own library of previous support sessions, support sessions stored on the user's device, or support sessions stored on a remote computing device, such as a customer support server available over the Internet. In the illustrated embodiment, the Help Session results 573 includes a hit listing 574 corresponding to a recorded support session regarding "how to create an email signature". The search screen 570 may further include a link 575 to launch a live customer support session. The user may select this link 575 instead of choosing to view a recorded session, or if a relevant recorded session is unavailable.

In some embodiments, users may choose to enable the support network 200 to monitor the user's activities on the user computer device 100. The support network 200 may include predictive software for anticipating the types of support issues that a particular user may require, based on that user's past activities. For example, if a user frequently spends an extended period of time navigating through various settings menus without changing any settings, the predictive software may anticipate that the user may require support in making changes to the device's settings. Based on these predictions, the support network 200 may present possible recorded support sessions of interest to the user, and/or automatically push the recorded support sessions to the user computing device 100 for storage in the storage element 602. As a result, the recorded support sessions that are anticipated to be the sessions of most likely interest to the user will be readily accessible, even when a network connection is unavailable to the user computer device 100. These recorded support sessions may be presented to the user in a help menu, or may be presented in response to queries entered by the user in a search tool on the device 100. The predictive software could use any form of predictive algorithm for anticipating a user's needs. For example, it may be possible to determine which support sessions would be most likely of use based on historical recordings of certain keywords or frequency of keyword entry into the help search screen, In embodiments described above, the support sessions may be generated, stored, and made available for later use by a customer support infrastructure, such as a customer support system provided by the manufacturer of the user computing device 100. These customer support systems typically utilize many customer support agents to support numerous users. In other embodiments, the support sessions may be provided in a private library produced by a single user for use by the general public or restricted use by one or more authorized users. In some embodiments, the support sessions may be provided on a one-to-one basis, without the use of a remote server for establishing the communication and storing the sessions. This may be desirable for people to provide direct assistance to friends, family members, or others.

In various embodiments described above, the user is utilizing the support session on a computing device including a display configured to display complex graphics. In other embodiments, the support sessions may be provided on computing devices that do not include a graphical display. These devices may include a much more limited user interface, such as one or more indicator lights or a limited text or graphical display. For example, a support session may be provided to remotely program a wireless peripheral device, such as a Bluetooth headset or printer.

Figure 6:
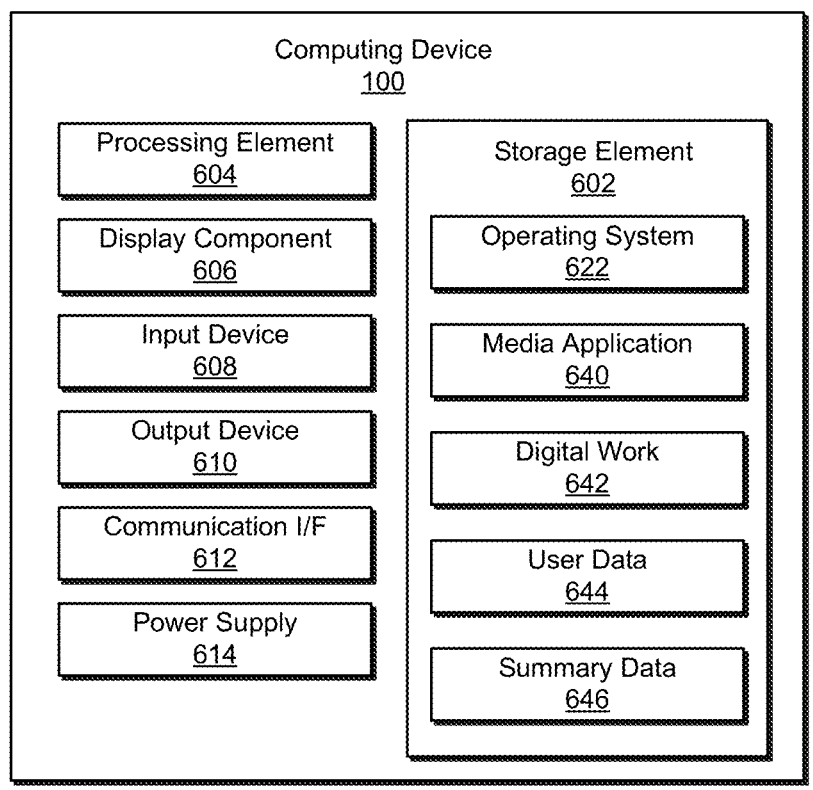
FIG. 6 illustrates an exemplary block diagram of a user computing device, in accordance with embodiments of the present invention.

FIG. 6 illustrates an exemplary block diagram of a user computing device 100, in accordance with embodiments of the present invention. The computing device 100 may be implemented as any of a number of electronic devices, such as an e-book reader, a tablet computing device, a smartphone, a media player, a portable gaming device, a portable digital assistant, a laptop computer, a desktop computer, and other devices providing media presentation functionality. It should be understood that various types of computing devices including a processing element, a memory, and a user interface for receiving user input can be used in accordance with various embodiments discussed herein. The electronic device 100 may not necessarily be a mobile or portable device, and thus, in some implementations may comprise a desktop personal computer, a gaming system, a television, other home electronics devices, and other devices providing media presentation functionality.

The computing device 100 may include a display component 606. The display component 606 may comprise, for example, one or more devices such as cathode ray tubes (CRTs), liquid crystal display (LCD) screens, gas plasma-based flat panel displays, LCD projectors, or other types of display devices, etc.

The computing device 100 may include one or more input devices 608 operable to receive inputs from a user. The input devices 608 can include, for example, a push button, touch pad, touch screen, wheel, joystick, keyboard, mouse, trackball, keypad, accelerometer, light gun, game controller, or any other such device or element whereby a user can provide inputs to the computing device 100. These input devices 608 may be incorporated into the computing device 100 or operably coupled to the computing device 100 via wired or wireless interface. For computing devices with touch sensitive displays, the input devices 608 can include a touch sensor that operates in conjunction with the display component 606 to permit users to interact with the image displayed by the display component 606 using touch inputs (e.g., with a finger or stylus).

The computing device 100 may also include at least one communication interface 612, comprising one or more wireless components operable to communicate with one or more separate devices within a communication range of the particular wireless protocol. The wireless protocol can be any appropriate protocol used to enable devices to communicate wirelessly, such as Bluetooth, cellular, IEEE 802.11, or infrared communications protocols, such as an IrDA-compliant protocol. It should be understood that the computing device 100 may also include one or more wired communications interfaces for coupling and communicating with other devices.

The computing device 100 may also include a power supply 614, such as, for example, a rechargeable battery operable to be recharged through conventional plug-in approaches, or through other approaches such as capacitive charging.

The computing device 100 also includes a processing element 604 for executing instructions and retrieving data stored in a storage element 602. As would be apparent to one of ordinary skill in the art, the storage element 602 can include one or more different types of memory, data storage or computer-readable storage media, such as, for example, a first data storage for program instructions for execution by the processing element 604, a second data storage for images or data and/or a removable storage for transferring data to other devices.

The storage element 602 may store software for execution by the processing element 604, such as, for example, operating system software 622 and media application 640. The storage element 602 may also store data, such as, for example, files corresponding to one or more digital works 642, user data 644 relating to the user's consumption of those digital works 642 and other device metrics, and summary data 646 relating to the digital works 642, as will be described in greater detail below.

Embodiments of the present invention may provide numerous advantages. For example, the user can experience the benefit of a personalized customer support experience, without re-engaging a live agent for assistance. In addition, if the recorded support session is stored locally in the storage element 602 of the user computing device 100, then the user may replay the support session and re-perform the desired operations even when a network connection is unavailable.

Although various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and, consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A computer-implemented method of providing customer support, comprising:
    conducting an online video support session for a user computing device and a support agent computing device, the online video support session comprising:
        transmitting user interface (UI) data representing UI content displayed on a display of the user computing device from the user computing device to the support agent computing device;
        receiving, by the user computing device, support content from the support agent computing device, the support content comprising graphical content;
        receiving, by the user computing device, control inputs from the support agent computing device;
        displaying the UI content and the graphical content on the display of the user computing device; and
        processing the control inputs on the user computing device to cause an operating system of the user computing device to perform operations in response to the control inputs; and
    recording the online video support session for the user computing device and the support agent computing device to generate a recorded support session including graphics data representing the graphical content and control input data representing the control inputs, and metadata regarding the online video support session;
    retrieving by the user computing device the recorded support session for the user computing device and the support agent computing device including graphics data representing the graphical content and control input data representing the control inputs based on a query of the metadata; and
    replaying the recorded support session on the user computing device, the replaying comprising redisplaying the graphical content and reprocessing the control inputs to cause the operating system to re-perform operations on the user computing device in response to the control inputs.

2. The method of claim 1, wherein:
    the processing the control inputs on the user computing device comprises processing the control inputs to cause the operating system to navigate one or more menus and select one or more options in the UI content; and
    the replaying the recorded support session comprises reprocessing the control inputs to cause the operating system to renavigate the one or more menus and reselect the one or more options in the UI content.

3. The method of claim 1, further comprising:
    storing a plurality of recorded support sessions on a server computer; and
    indexing each of the plurality of recorded support sessions based on descriptive tags in the metadata describing operations performed during the recorded support session.

4. A computer-implemented method of providing user support, comprising:
    transmitting user interface (UI) data representing UI content displayed on a display of a first computing device from the first computing device to a second computing device;
    receiving, by the first computing device and from the second computing device, support content;
    receiving, by the first computing device and from the second computing device, input data representing inputs;
    processing the inputs on the first computing device to cause the first computing device to perform operations in response to the inputs;
    receiving, by the first computing device, a recorded support session for the first computing device and the second computing device, wherein the recorded support session represents the support content received from the second computing device and input data representing the inputs received from the second computing device; and
    replaying, by the first computing device, the recorded support session, the replaying comprising reprocessing the inputs to cause the first computing device to re-perform operations in response to the inputs.

5. The method of claim 4, wherein:
    the inputs comprise control inputs; and
    the reprocessing the inputs comprises selecting graphical elements in UI content displayed on the first computing device.

6. The method of claim 4, wherein the support content comprises graphics data representing graphical content, and the method further comprises:
    displaying on the display of the first computing device the UI content and the graphical content, wherein the replaying the recorded support session comprises redisplaying the graphical content and reprocessing the inputs.

7. The method of claim 4, wherein the inputs are generated in response to inputs provided by a user of the first computing device.

8. The method of claim 4, further comprising:
    receiving, by the first computing device, input data representing inputs generated in response to inputs provided by a user of the second computing device.

9. The method of claim 4, further comprising:
    sending, by the first computing device, a request for the recorded support session, the request including metadata relating to the support session, the metadata comprising one or more of the following: information regarding the first computing device, operations performed during the support session, or information entered into the first computing device or the second computing device; and receiving, by the first computing device, the recorded support session based on the request.

10. The method of claim 9, further comprising:

storing a plurality of recorded support sessions on a storage system; and indexing each of the plurality of recorded support sessions based on the metadata regarding each recorded support session.

11. The method of claim 10, further comprising:

detecting activity on a third computing device;

identifying one or more of the plurality of recorded support sessions related to the detected activity on the third computing device based on the metadata regarding the one or more of the plurality of recorded support sessions; and delivering the identified one or more of the plurality of recorded support sessions to the third computing device.

12. The method of claim 10, further comprising:

receiving a search query on a third computing device;

identifying one or more of the plurality of recorded support sessions associated with metadata related to the search query; and delivering the identified one or more of the plurality of recorded support sessions to the third computing device.

13. The method of claim 4, further comprising:

performing operations in response to the inputs to navigate one or more menus and select one or more options in the UI content.

14. The method of claim 4, further comprising:

receiving, by the first computing device, a first option to view a passive recording of the recorded support session for the first computing device and the second computing device; and receiving, by the first computing device, a second option to view an active recording of the recorded support session for the first computing device and the second computing device.

15. The method of claim 4, further comprising:

sending, by the first computing device, a request for the recorded support session, the request including metadata relating to the support session, the metadata comprising operations performed by the processing the inputs during the support session; and retrieving, by the first computing device, the recorded support session for the first computing device and the second computing device from a support session library based on the request, wherein the support session library includes previous support sessions related to a particular user.

16. A computing device, comprising:

a display;

a processing component; and a computer-readable memory storing computer-executable instructions which when executed cause the processing component to perform a method comprising:

conducting a recorded support session for the computing device and a second computing device, said recorded support session comprising:

transmitting user interface (UI) data representing UI content displayed on the display from the computing device to a second computing device;

receiving, by the computing device and from the second computing device, support content;

receiving, by the computing device and from the second computing device, input data representing inputs;

processing the inputs with the processing component to cause software on the computing device to perform operations in response to the inputs; and replaying the recorded support session for the computing device and a second computing device, wherein the recorded support session represents the support content and the input data representing the inputs, and wherein the replaying the recorded support session comprises reprocessing the inputs to cause the computing device to re-perform operations in response to the inputs.

17. The device of claim 16, wherein:

the inputs comprise inputs for interacting with a gaming software application.

18. The device of claim 16, wherein the computer-executable instructions when executed cause the processing component to perform the method further comprising:

receiving, by the computing device and from the second computing device, graphical content;

displaying the UI content and the graphical content on the display of the computing device; and redisplaying the graphical content and reprocessing the inputs.

19. The device of claim 16, wherein the inputs comprise one or more of the following: data corresponding to global positioning system data, peripheral input device data, or device sensor data.

20. The device of claim 16, wherein:

the support content comprises graphical content for instructing a user of the computing device on operation of the computing device.

21. The device of claim 16, wherein the computer-executable instructions when executed cause the processing component to perform the method further comprising:

receiving, by the computing device and from the second computing device, audio content;

playing the audio content; and displaying the support content.

22. The device of claim 16, wherein the computer-executable instructions when executed cause the processing component to perform the method further comprising:

receiving, by the computing device and from the second computing device, a video stream;

playing the video stream; and displaying the support content.

* * * * *